March 15, 1927.  F. M. HAMANN  1,620,965
ANTISKID DEVICE
Filed Feb. 19, 1925
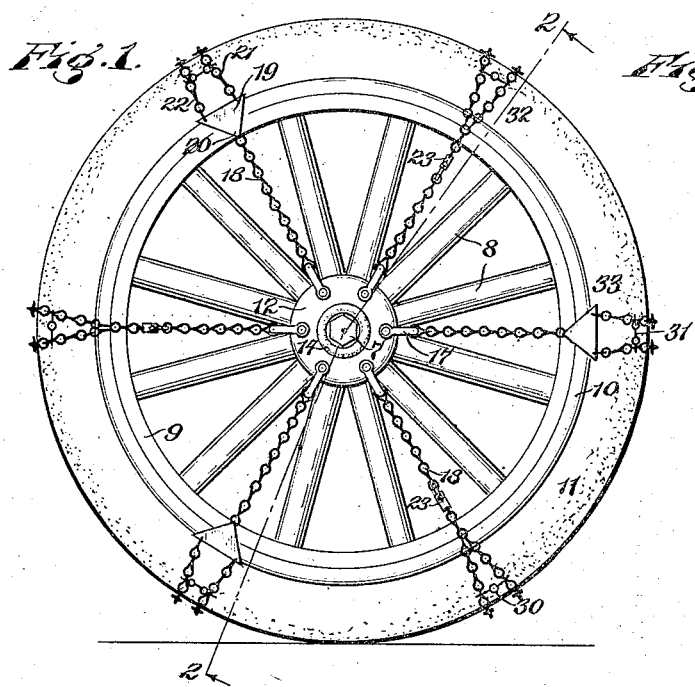
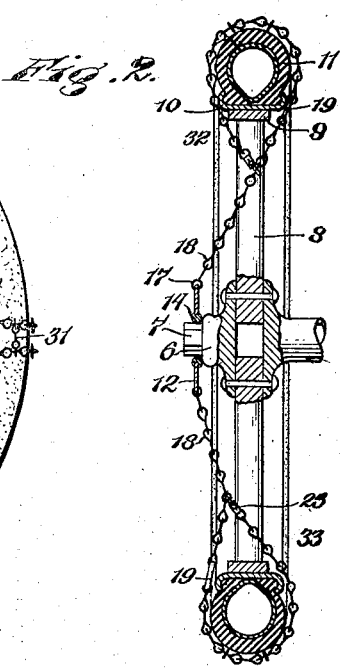
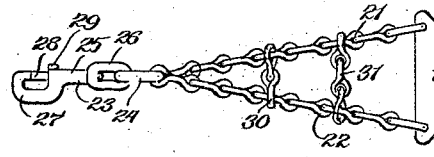
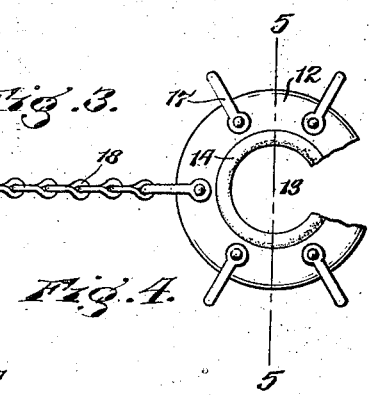
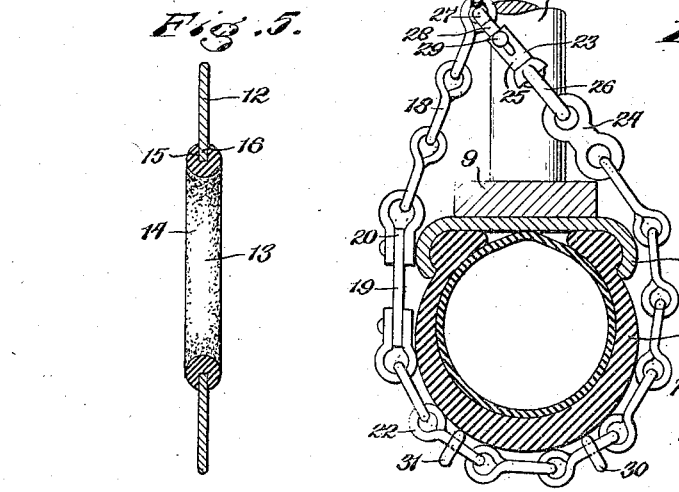
Inventor
Frank Martin Hamann Patented Mar. 15, 1927.

1,620,965

UNITED STATES PATENT OFFICE.

FRANK MARTIN HAMANN, OF DUNKIRK, NEW YORK.

ANTISKID DEVICE.

Application filed February 19, 1925. Serial No. 10,240.

This invention relates to an antiskid chain or device and has for its object the provision of such a chain which can be quickly, easily and reliably applied to the wheel of the automobile or other vehicle without requiring the same to be jacked up or otherwise moved in order to place the chain around the tire.

A further object is to provide a chain in which an increased antiskid effect is obtained against both a forward or sidewise sliding movement of the automobile on an icy or slippery street.

Still further objects are to provide an antiskid chain which is simple and inexpensive, and in which the parts are all connected so as to form a unit, and in which the wearing parts of the chain can be replaced without removing the entire chain.

In the accompanying drawings:—

Figure 1 is a side elevation of an automobile wheel equipped with my antiskid chain.

Figure 2 is a transverse section of the same, the section being taken generally on line 2—2, Fig. 1.

Figure 3 is a fragmentary side elevation of the center disk and one of the chains forming a part of the system, showing the chain extended or lying in a flat position.

Figure 4 is a transverse section of the tire, rim and felly of an automobile wheel showing the manner in which the ends of the chain are locked around the same.

Figure 5 is a section of the center disk and annular cushion, the same being taken on line 5—5, Fig. 3.

Similar reference numerals indicate the same part in each of the several views.

In its general organization this invention comprises a plate or disk which is adapted to engage the hub of the automobile wheel and is suitably cushioned thereon to prevent chafing and injuring the finish of the hub, and a plurality of spaced chains adapted to extend radially from the periphery of the disk, the ends of the chains being adapted to extend around the tire and felly of the wheel and to be removably fastened to the radially extending part thereof whereby the tire is completely surrounded by the chain at spaced intervals.

The vehicle wheel to which this chain may be applied may be of any suitable construction, that shown comprising the usual hub 6 on which is secured a hub cap 7, spokes 8, felly 9 and demountable rim 10 on which is arranged the casing 11 of the tire.

The plate or disk 12 which connects the several chain sections of the invention is of annular form and is provided centrally with a circular opening 13 which permits the disk to be placed around the hub 6 and to be held centrally of the wheel thereby. In order to prevent this disk from coming in contact with the hub and thereby chafe and mar the finish of the same, a ring 14 of rubber or other suitable soft material is provided which is provided with a peripheral channel or groove 15 adapted to engage the inner circular edge 16 of the disk. This rubber ring is circular in cross section, as shown in Figure 5 and extends outwardly from either side of the disk thereby cushioning the same on the hub and holding them in spaced relation.

Extending radially from the edge of the disk are a plurality of flexible chains 18 which are provided in a suitable number, six being shown in the drawings, and are secured to the disk by shackles or links 17. At the outer end of each of these chains and adjacent the side of the tire is arranged a spreader plate 19 which has the form of an isosceles triangle and is secured to the radially extending chain 18 at its apex 20. At the other corners of the spreader plate are secured the antiskid cross chains 21 and 22 which are adapted to extend around the outer or traction side of the tire casing and be secured at their opposite ends to one of the links of the radial chain 18 by a fastening 23, which fastening is arranged between the spokes of the wheel. The fastening 23 and each end of the cross chains 21 and 22 are connected by a link 24, and since the inner ends of the cross chains are spaced apart by the spreader plate 19, the cross chains are convergent. By converging the cross chains in this manner an increased scraping resistance is offered to a side skid since the chains are dragged at an angle to the line of movement and consequently offer a wedging resistance to the surface of the road, thereby increasing the efficiency of the same.

Any approved fastening may be used to lock the chain about the wheel, the fastening 23 shown comprising a shank 25 having a swivel connection with a link 26, and a hook 27 at its outer end. A bolt 28 is movably arranged in the shank and is pressed by spring means (not shown) against the outer end of the hook, a suitable finger piece 29 being provided to permit the bolt to be withdrawn when the fastening is being engaged or disengaged from the chain 18.

In order to increase the efficiency of the skid chain, the cross chains 21 and 22 are joined by two chains 30 and 31 which are arranged intermediate the spreader plate and the fastening 23 and are adapted, when the chain has been applied, to lie on either side of the center of the tire casing in contact with the road, as best shown in Figure 4. By the addition of these chains the resistance of the chain to both forward and side skidding is increased and the cross chains are also held in a proper position to offer the maximum scraping resistance.

The chains may be mounted on the wheel in any manner found convenient or desirable, that is, the chain may first be passed through the spokes and fastened from the outside as indicated at 32 or they may be passed around in the reverse direction as indicated at 33, or they may be arranged alternately, as shown in Figure 1.

This antiskid chain is of very simple and durable construction and can be easily and conveniently applied without moving the wheel and without requiring the use of any special tools or skill and when in place is not liable to become unfastened. Moreover as the cross chains become worn they can be replaced without taking off the entire chain, since each chain can be removed from the casing independently of the others and repaired or substituted and replaced.

Although two short longitudinal chains 30, 31 are shown on the gripping section of antiskid chains it is to be understood that a greater number may be used if desired and that the same may be distributed along the convergent chains 21, 22 so as to operate most effectively not only when running over a comparatively even road but also to aid in climbing out of a rut in icy weather.

Inasmuch as all of the radial stretches of the antiskid device come together on the centering disk or ring which receives the cap of the hub all strains to which this device is subjected either while driving forwardly, or backing up, or when sliding sidewise in either direction will be concentrated on the hub cap, whereby these strains will cause a downward pressure on the axle of the car and effectively resist any tendency to displace the same on the tire, but instead holds the gripping sections in place on the tire and compels them to take hold of the road and increase the traction as well as prevent side skidding.

I claim as my invention:—

1. An antiskid device comprising a plate adapted to be held centrally of a vehicle wheel, a spreader plate arranged adjacent the side of the tire of said wheel, a radially extending chain connecting said plates, a plurality of antiskid chains secured to said spreader plate and adapted to extend around the outer side of said tire and means for detachably securing the outer ends of said antiskid chains to said radially extending chain.

2. An antiskid device comprising a plate adapted to be held centrally of a vehicle wheel, a spreader plate arranged adjacent the side of the tire of said wheel, a radially extending chain connecting said plates, a plurality of antiskid chains secured to said spreader plate and adapted to extend around the outer side of said tire, a link connecting the outer ends of said antiskid chains, and means for detachably securing said link to said radially extending chain.

3. An antiskid device comprising a plate adapted to be held centrally of a vehicle wheel, a spreader plate arranged adjacent the side of the tire of said wheel, a radially extending chain connecting said plates, a plurality of antiskid chains extending outwardly from the outer sides of said spreader plate, a link connecting the outer ends of said antiskid chains whereby said chains are convergent, means for detachably securing said link with said radially extending chain, and an antiskid chain connecting said convergent chains intermediate said spreader plate and link and adapted to engaged the road.

4. An antiskid device comprising a plate adapted to be held centrally of a vehicle wheel, a spreader plate arranged adjacent the side of the tire of said wheel, a radially extending chain connecting said plates, a plurality of antiskid chains extending outwardly from the outer sides of said spreader plate, a link connecting the outer ends of said antiskid chains whereby said chains are convergent, means for detachably securing said link with said radially extending chain, and a plurality of antiskid chains connecting said convergent chains at both sides of the center of the tire and adapted to engage the road.

In testimony whereof I affix my signature.

FRANK MARTIN HAMANN.